(12) United States Patent
Biere et al.

(10) Patent No.: US 7,720,872 B1
(45) Date of Patent: May 18, 2010

(54) SOFTWARE INTERFACE MAPPING TOOL

(75) Inventors: Devon L Biere, Olathe, KS (US); Charles L. Micklavzina, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 355 days.

(21) Appl. No.: 11/369,510

(22) Filed: Mar. 7, 2006

(51) Int. Cl.
G06F 17/30 (2006.01)
G06F 15/16 (2006.01)

(52) U.S. Cl. .................. 707/802; 707/803; 707/804

(58) Field of Classification Search .................. 707/102
See application file for complete search history.

(56) References Cited

U.S. PATENT DOCUMENTS

| | | | |
|---|---|---|---|
| 5,448,726 A * | 9/1995 | Cramsie et al. | 707/103 R |
| 6,385,618 B1 * | 5/2002 | Ng et al. | 707/103 Y |
| 6,631,519 B1 * | 10/2003 | Nicholson et al. | 717/169 |
| 2001/0044811 A1 * | 11/2001 | Ballantyne et al. | 707/513 |
| 2002/0026630 A1 * | 2/2002 | Schmidt et al. | 717/103 |
| 2003/0005408 A1 * | 1/2003 | Tumati | 717/110 |
| 2003/0046130 A1 * | 3/2003 | Golightly et al. | 705/7 |
| 2003/0154216 A1 * | 8/2003 | Arnold et al. | 707/104.1 |
| 2005/0166193 A1 * | 7/2005 | Smith et al. | 717/143 |
| 2006/0037022 A1 * | 2/2006 | Byrd et al. | 718/104 |
| 2006/0248448 A1 * | 11/2006 | Williams et al. | 715/513 |

OTHER PUBLICATIONS

Biere, et al., Patent Application entitled "Software Interface mapping Tool," U.S. Appl. No. 11/321,380, filed Dec. 29, 2005 (39 pages).

* cited by examiner

*Primary Examiner*—Tony Mahmoudi
*Assistant Examiner*—Brittany N McCue

(57) ABSTRACT

Disclosed herein is an automated software interface mapping tool for determining and documenting caller/provider relationships, data structures, and data transformations as a system logical data model of a single system or across multiple systems in an enterprise. The system logical data model may be stored as a set of structures and data elements in a metadata repository. The metadata repository enables improved impact analysis, documents dependencies, serves as a tool for implementing application rationalization, and aids in the creation of future code for the generation of new applications or systems.

17 Claims, 12 Drawing Sheets

Building an Abstract Interface Model

SOFTWARE INTERFACE MAPPING TOOL

CROSS-REFERENCE TO RELATED APPLICATIONS

None.

STATEMENT REGARDING FEDERALLY SPONSORED RESEARCH DEVELOPMENT

Not applicable.

REFERENCE TO A MICROFICHE APPENDIX

Not applicable.

BACKGROUND OF THE INVENTION

As software systems are created they implement a complex web of caller/provider relationships between various applications and data sources. As changes are made in a system it is presently left to the people who made those changes to properly document how the system has been changed. If no documentation is created then there is no effective way to determine how future changes or additions will impact the system. In the past there have been efforts to manually create metadata repositories for documenting the structure and changes made in a system; however, they were quickly abandoned due to a number of reasons. One reason for abandonment was the large number of man hours needed to create and maintain the repository. Another reason was the fact that the integrity of the entire repository is put in question even if only one change is not properly updated in the repository. Once the integrity is questioned people are less likely to take the time to make future updates since it will add little or no value to the repository.

This problem is further exacerbated in an enterprise where multiple systems are communicating with each other. Still further complexity is added since as an enterprise grows and changes, legacy systems within the enterprise might not present data in a useful way for newer systems that are created. As such there is created a middleware transaction manager that enables communication between various systems.

Within an enterprise the number of man hours needed to manually create a metadata repository for the entire enterprise increases along with the number of systems operating within that enterprise and the number of transactions that need to be managed by the middleware. Further, since there are more changes occurring across an enterprise than just within a single system, there are more people responsible for updating the repository and there is a greater chance that updates to the repository won't be made, causing the repository's utility to be reduced due to the data's lack of integrity. As such, it has not been feasible to create and maintain such a repository to date.

SUMMARY OF THE INVENTION

A method for documenting caller/provider relationships, data structures, and data transformations as an abstract interface model in a system is initiated by identifying a group of candidate applications in a system. Abstract interface models of those applications are then built by identifying caller/provider touch points both internal and external to each candidate application. Next, it is determined if there are touch points to other applications in the system. For each additionally identified application the steps of building an abstract interface model of the applications and determining if there are touch points to other applications in the system are repeated. Once all of the applications in the system have had an abstract interface model created, a system logical data model may be created from the abstract interface models. This system logical data model is then stored as a set of structures and data elements in a metadata repository. The process of creating a system logical data model can be repeated for each system in an enterprise to create an enterprise logical data model. The enterprise logical data model can similarly be stored as a set of structures and data elements in a metadata repository.

DETAILED DESCRIPTION OF THE PREFERRED EMBODIMENTS

Disclosed hereinbelow is a method for documenting caller/provider relationships, data structures, and data transformations as an abstract interface model in a system or across multiple systems in an enterprise in an automated fashion or with minimal user input. This is accomplished by identifying caller/provider touch points between applications in a system and between systems in an enterprise. Once the caller/provider touch points have been identified for a system, a system logical data model may be created and stored as a set of structures and data elements in a metadata repository. The process of creating a system logical data model can be repeated for each system in an enterprise to create an enterprise logical data model which can similarly be stored as a set of structures and data elements in a metadata repository. This method of creating a system logical data model or an enterprise logical data model enables the creation of a metadata repository that is accurate, easily updatable, doesn't tax system or enterprise resources while generating the metadata repository, and doesn't require the large number of man hours to create and maintain the metadata repository manually as is done in the prior art. The metadata repository enables improved impact analysis, documents dependencies, serves as a tool for implementing application rationalization, and aids in the creation of future code for the generation of new applications or systems.

Figure 1:
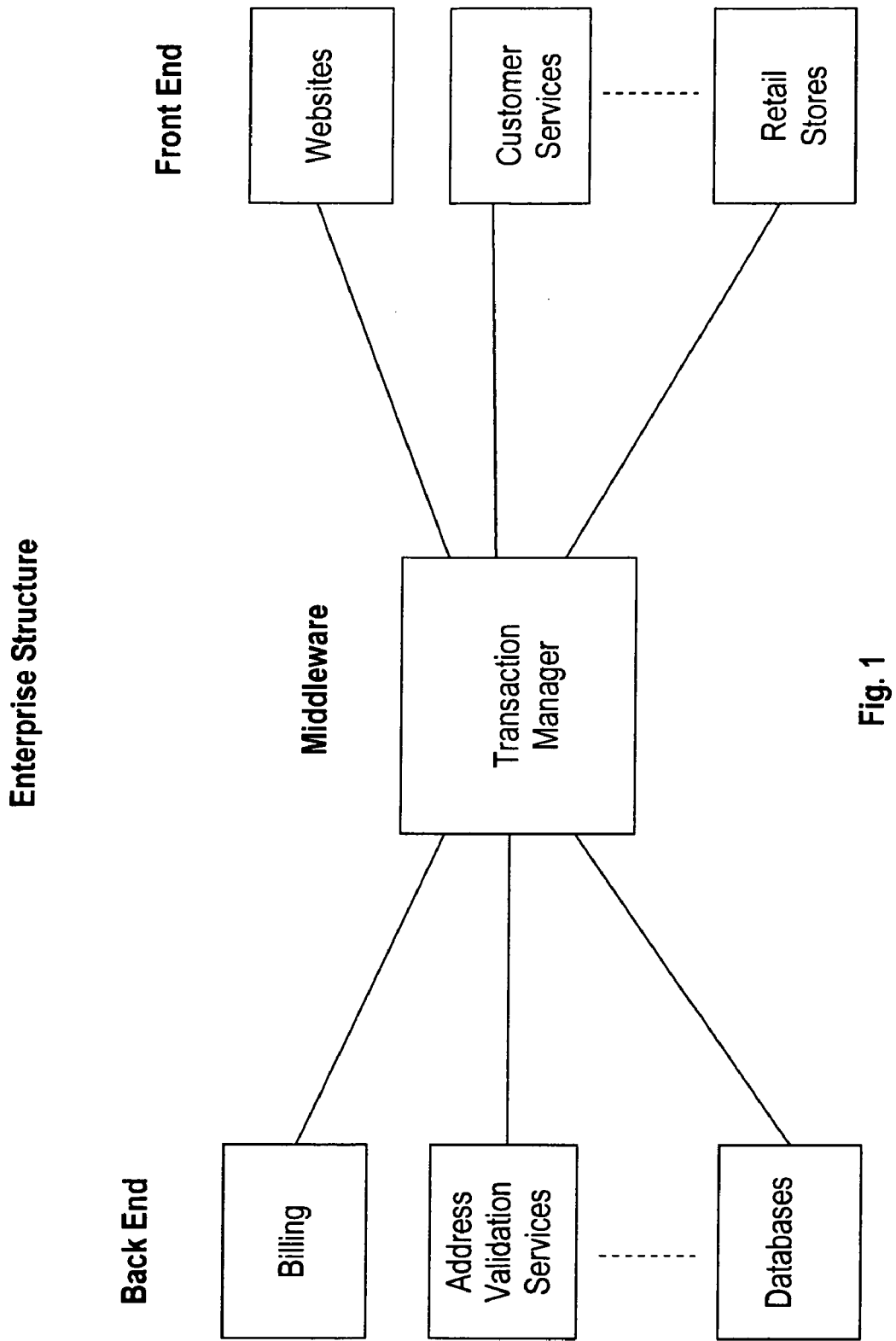
FIG. 1 is a block diagram representation of multiple systems in an enterprise communicating through a middleware transaction manager.

The basic structure of an illustrative enterprise comprises front end systems, back end systems, and a middleware environment of one or more systems to provide communication between all of the systems as shown in FIG. 1. The back end comprises systems such as a billing system, an address validation system, and various databases. The front end comprises systems such as websites, customer services, and retail stores. Front end systems and back end systems communicate with each other via middleware that performs transaction management, e.g., by implementing an Application Program Interface (API) layer, and providing data transformations. The transaction manager may fetch various data from one back end system and put it in usable form for another back end system or a front end system as shown in FIG. 2.

Figure 2:
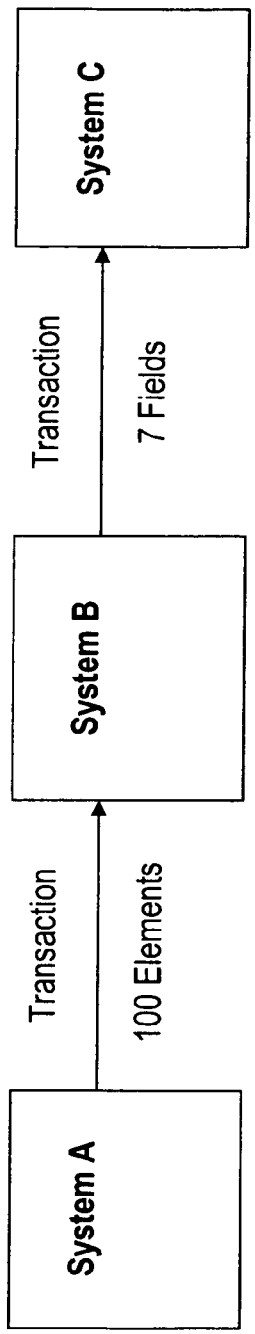
FIG. 2 shows an example of the flow of data between two systems through a middleware system.
Figure 3:
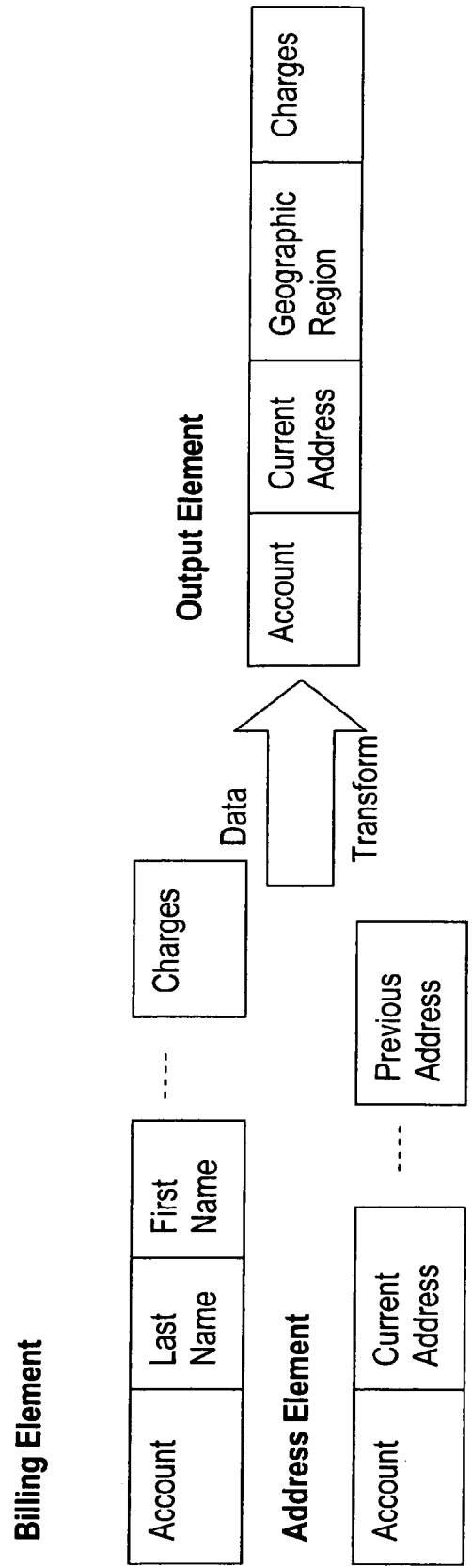
FIG. 3 shows an example of a data transformation that can be performed by the middleware transaction manager.

FIG. 2 shows an illustrative data flow that may occur when the middleware receives a request from a system in either the front end or back end of an enterprise. The middleware communicates with one or more systems in the front end or back end of the enterprise to fetch multiple elements of data. These elements are then manipulated by a middleware system to provide an input in a format that is useful for the system providing the request. FIG. 2 shows this through a middleware system B communicating with a system A by way of one or more transactions to fetch 100 elements. Middleware system B then manipulates the 100 elements to produce a single output element with just 7 fields. The output element is then communicated to system C through another transaction. For example, a website running on the front end could be used so a customer can check the status of their account. The system running this website would then communicate through the middleware to the various systems, such as the billing system, to gather the necessary elements. FIG. 3 shows an example of the type of manipulation the middleware may provide for the website to communicate with systems on the back end.

As illustrated in the example of FIG. 3 the middleware fetches data elements such as a billing data element and an address data element. These data elements may be fetched from various systems on the back end. In this example, the billing data element is fetched from the billing system and the address data element is fetched from the address validation services system. The middleware then performs a data transformation on the elements that were fetched by selecting various fields from the back end data elements, manipulating the data elements, and putting them together in a specified order as an output data element. In this example the website needs a data element indicating an account number, current address, geographic region, and charges associated with that account. As such, the middleware selects the account field and the current address field from the address data element and manipulates the address data element by analyzing the zip code to determine the geographic region. The middleware also selects the charges field from the billing data element and then creates an output data element with the fields of data in the order specified by the website.

Figure 4:
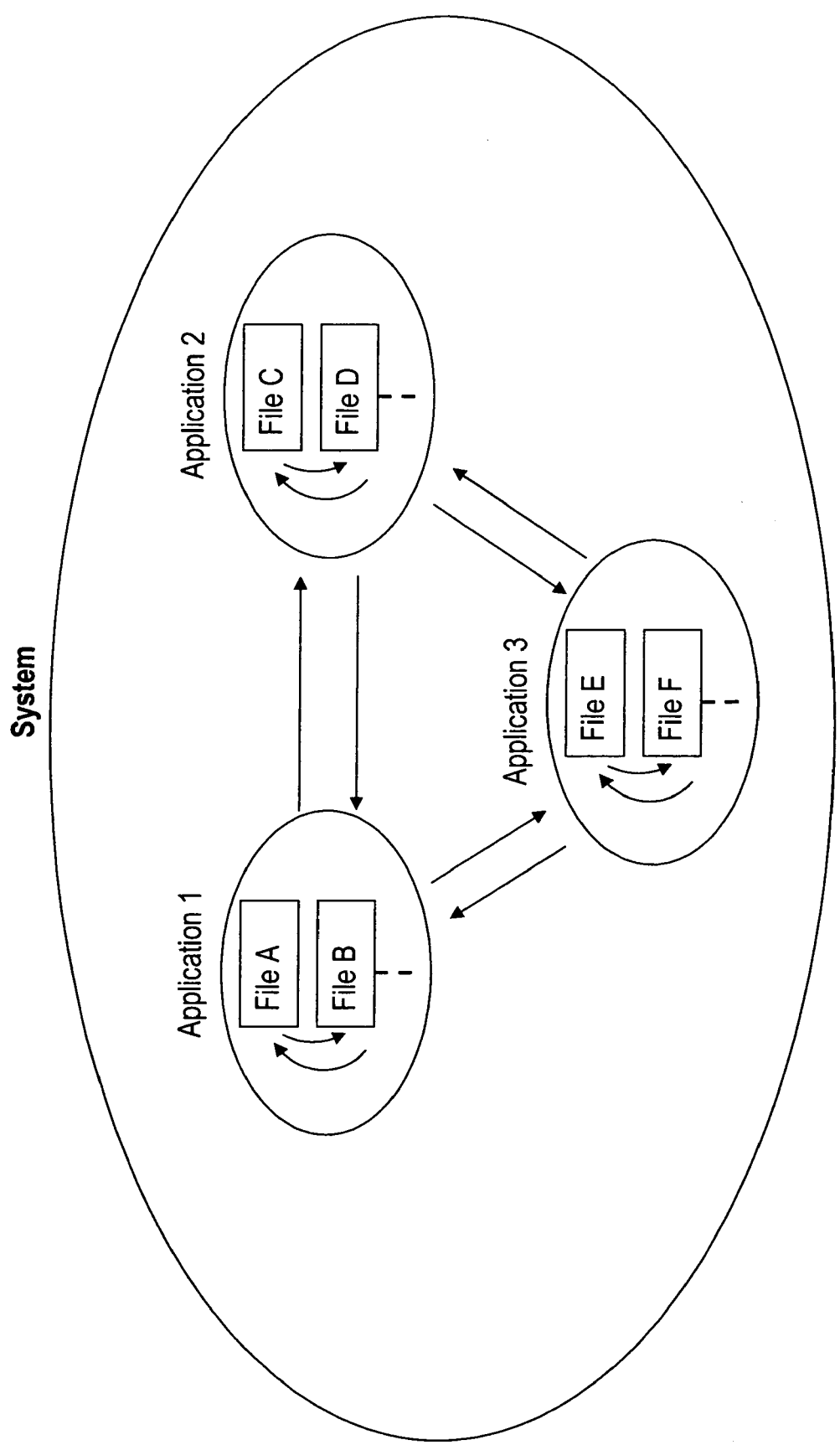
FIG. 4 shows an illustrative relationship between files and appliations within a system.

Each system within an enterprise may comprise a plurality of applications and each application may comprise a plurality of files as shown by the example in FIG. 4. In order to properly document caller/provider relationships, data structures, and data transformations as a system logical data model it should be understood how each application in that system operates and interacts with the other applications. As such, it should also be understood how the files within each application are structured and relate to one another and to data sources.

Since each system within an enterprise should be individually mapped, it is desirable to start in the middleware system or systems. This starting point is desirable because nearly all communications between enterprise systems flows through the middleware, and hence the middleware contains nearly all of the information for communicating between all of the systems in the enterprise. Thus, by creating an interface model of the middleware a basic understanding of the caller/provider relationships and data flow of the entire enterprise is gained.

Similarly, within each system it is desirable to start with core applications where the majority of traffic within each system occurs. This provides a basic understanding of the caller/provider relationships and data flow of the system and enables the identification of additional applications within the system in order of most important to least important.

The creation of an interface model may be implemented in a hierarchical manner to map an existing system or an enterprise. Alternatively, various embodiments of the software interface mapping tool can be used to create abstract interface models of newly created systems or systems in the process of creation. The implementation of the software interface mapping tool with systems in the process of creation could be used to optimize data flow within the system being created and optimize interaction with existing systems.

Figure 5:
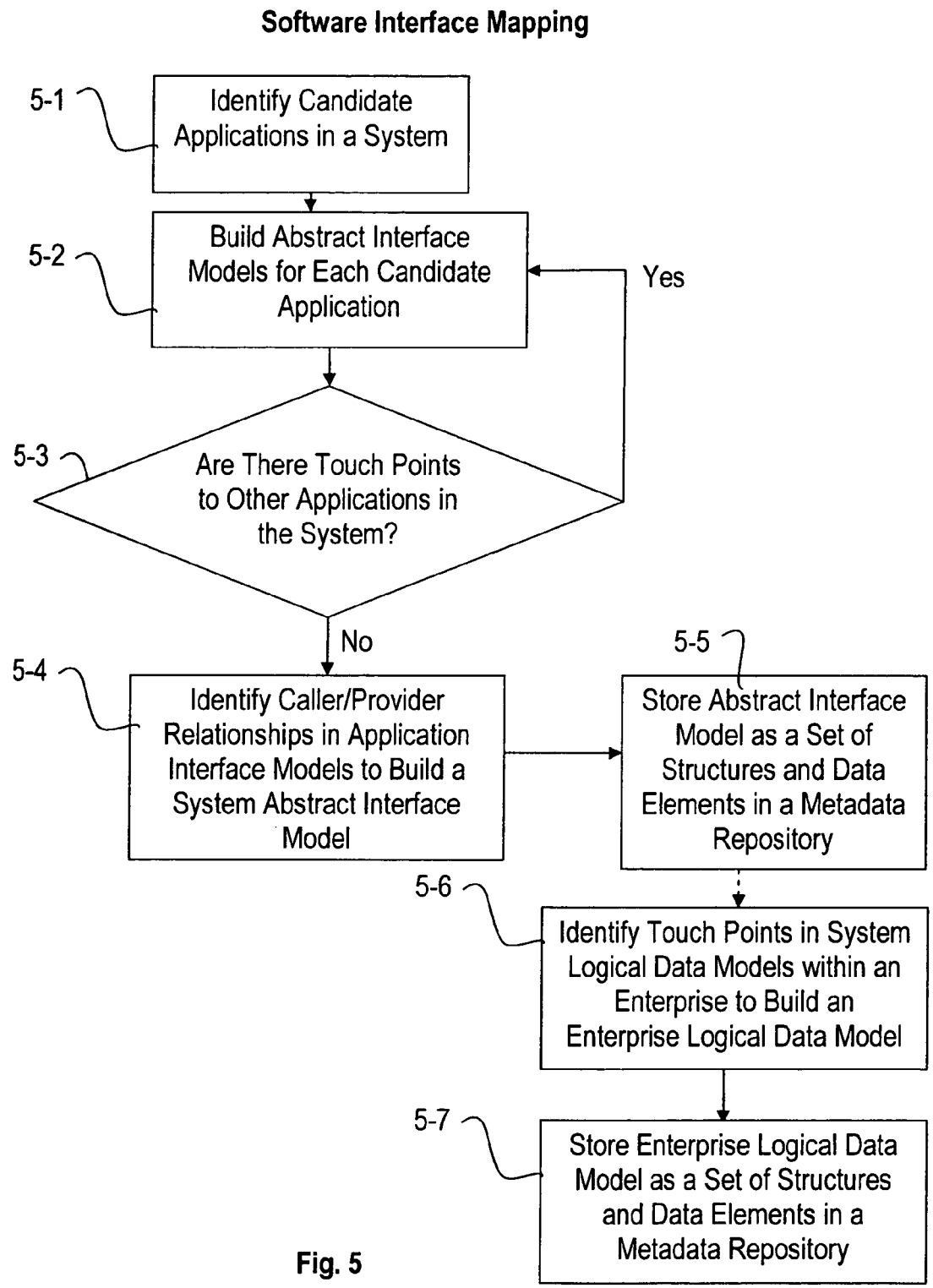
FIG. 5 is a flow diagram showing the steps performed by some embodiments of a software interface mapping tool.

With reference to FIG. 5 there is shown a flow diagram of an illustrative method for using a software interface mapping tool to create an abstract interface model of a system.

In step 5-1 a group of applications within a system are identified either manually, automatically, or a combination of both. One way for implementing this step manually is for a user of the software interface mapping tool to identify which applications are the core applications of the system. A way for implementing this step in an automated fashion would be to utilize a software agent such as a network sniffer to identify a predetermined number of high-value nodes, such as the ten nodes where network traffic within the system is the greatest. Upon identifying the high-value nodes, the applications present at these nodes are systematically identified. Alternatively, a combination of manual and automated identification of candidate applications may be accomplished by manually selecting a set of core applications at the high-value nodes that were identified by the network sniffer software agent.

Figure 6:
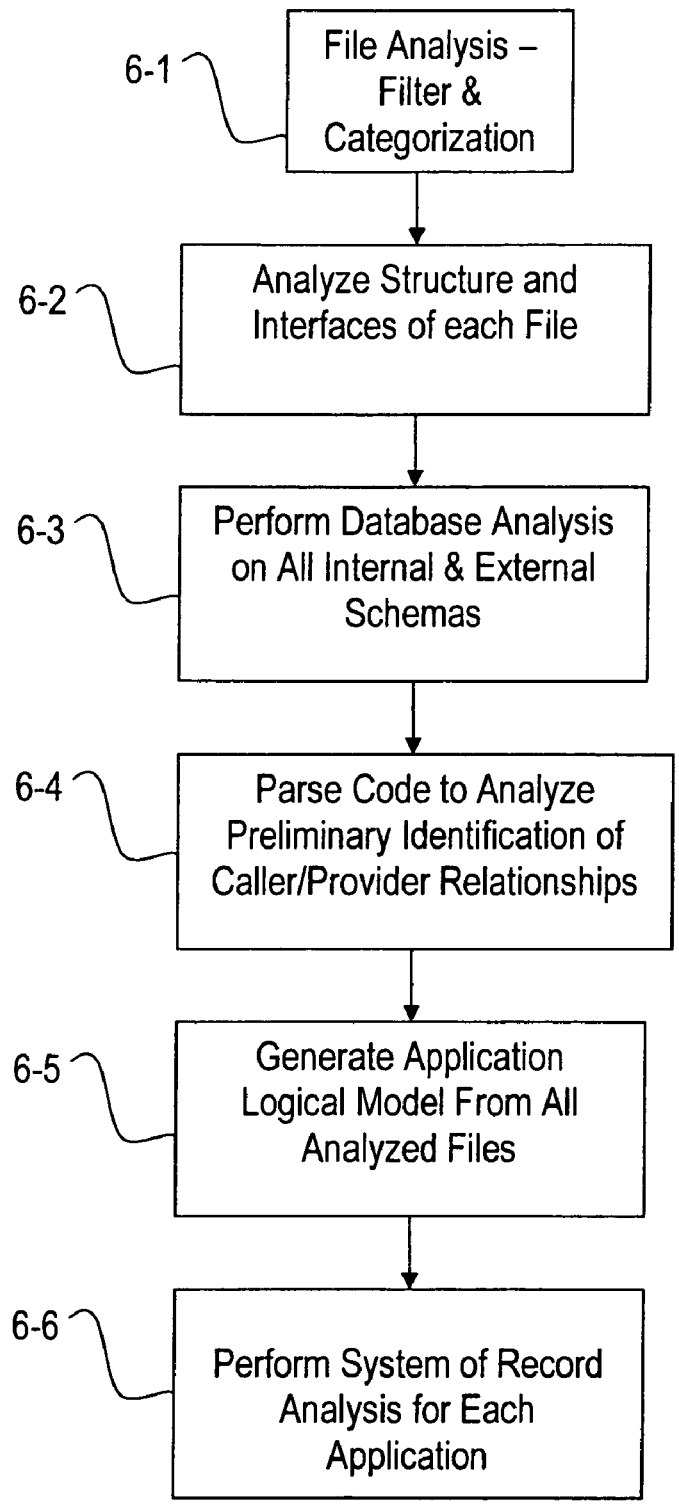
FIG. 6 is a flow diagram showing illustrative steps to accomplish step 5-2.

In step 5-2 an interface model is built for each application. One way of accomplishing this is through the process illustrated in FIG. 6.

In step 6-1 a file analysis is performed for the files of each of the candidate applications. The file analysis may be performed on application source code files as well as data files associated with the source code or data files to be used by the applications as they run. Source code files are herein defined as any file that is human readable or able to be parsed and includes program language files as well as configuration files. Program language files are files such as JAVA files, C++ files, scripts, etc. Configuration files are files such as a Web Services Description Language (WSDL) for a web service, or Java properties files, Extensible Markup Language (XML) files, etc. The data files can include files containing schemas, Data Definition Language (DDL) files, or any file defining how the data is laid out and where it is stored. The source code files are then organized into groups based on the class of each file and any files not fitting into one of these groups, such as some binary files, may be discarded from further consideration. It should be noted that it may be possible to reverse engineer the source code from binary and other files if it is legally permissible and the source code is not otherwise available.

In step 6-2 the code from each source code file is individually analyzed and cataloged by a software agent. This analysis may be accomplished by having a different software agent for each program language. For example, a JAVA file may be analyzed by a software agent for JAVA files. These agents will parse the source code to identify within each file the classes (name, type, package, visibility, etc.); variables (name, type, size, visibility, etc.); methods (name, visibility, etc.); and method parameters (name, type, size, exceptions, etc.). From this analysis there is built an interface representation of each of file showing the structures and functions.

Figure 7A:
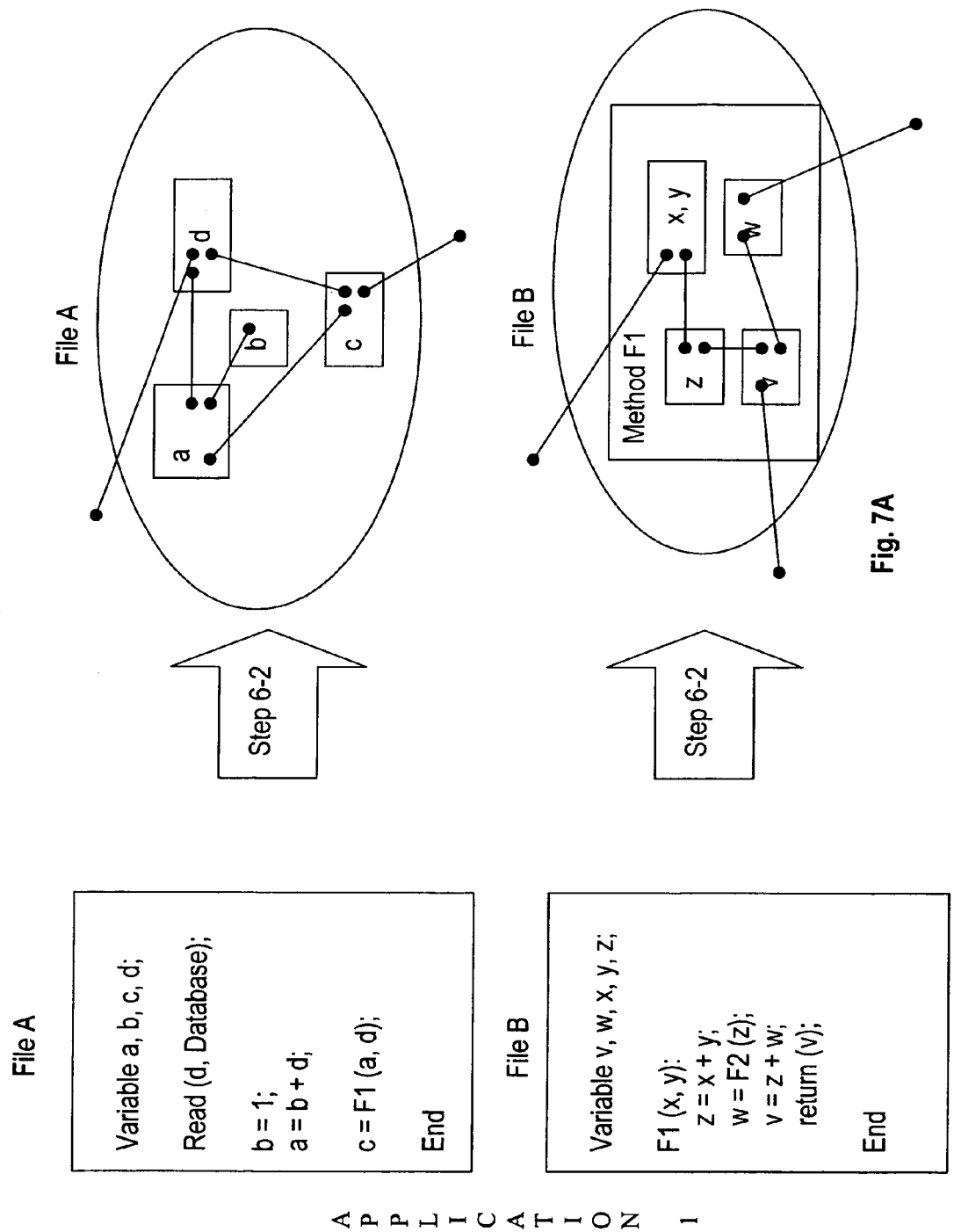
FIG. 7A is an illustrative diagram demonstrating the process of step 6-2 of cataloguing and showing an interface representation of each of the files within an application.

FIG. 7A shows an illustrative process for step 6-2. Within Application 1 there are two files that are to be analyzed, File A and File B. For File A, the software agent determines that there is an external input to variable d; an operation a uses variables b and d; and an operation c makes an external function call F1 passing variable d and the result of operation a. For File B it is determined that method F1 is defined having two input variables x and y; an operation z uses the variables x and y; an operation w makes an external function call F2 passing the results of operation z; an operation v uses the results of operations z and w; and the results of operation v are passed back to the file which called method F1.

In step 6-3 database analysis is performed on the data files, data structures, or anywhere schemas are identified using another software agent. This analysis consists of identifying for each schema, descriptors such as the tables (name); constraints (keys, checks); columns (name, type, size, nullability, default values, sequential order); stored procedures; internal transformations and views. Note that the schemas identified can be either internal or external to the application. Namely a file can contain a schema or can point to a database which stores the schema. The database analysis would also be performed for any identified databases so as to create an abstracted view of the database. Therefore a data structure in a file will look similar to an abstracted data structure in a database and allow mapping between them. As such, in the example of FIG. 7A, the database read from by File A would have the database analysis performed on it so as to allow mapping between the data elements read from the database and variable d in File A.

In step 6-4 the code is parsed in a second analysis by stepping through the code and determining the logical outcome of each line of code by a parsing software agent. This allows the mapping of internal variables to method parameters and method variables as well as mapping component data elements to database data elements. By logically executing the lines of code the flow of data can be followed in transformations of data elements through method execution as well as determining a sequence of calls made in each method. This allows for the creation of an interface model of each file showing internal touch points, such as local function calls. External application candidates are also provided through the determination of external touch points, such as database access or external method calls. Touch points are defined as any identifiable interaction between: a file and other files; a file and a data source; an application and other applications; or a system and other systems. The interface technologies employed at the external touch points can be identified, for example, based on the syntax of the calls. Some such technologies can include Enterprise JavaBeans (EJB), Common Object Request Broker Architecture (CORBA), web services, direct database access, etc. Through this abstraction process field to field mappings of various complex structures in each class of source code can be accomplished. For example, a structure in a JAVA file can be mapped to a structure in a C++ file. Therefore a preliminary identification and mapping of the caller/provider relationships in each file throughout the application can be performed as shown in the example of FIGS. 7B and 7C.

Figure 7B:
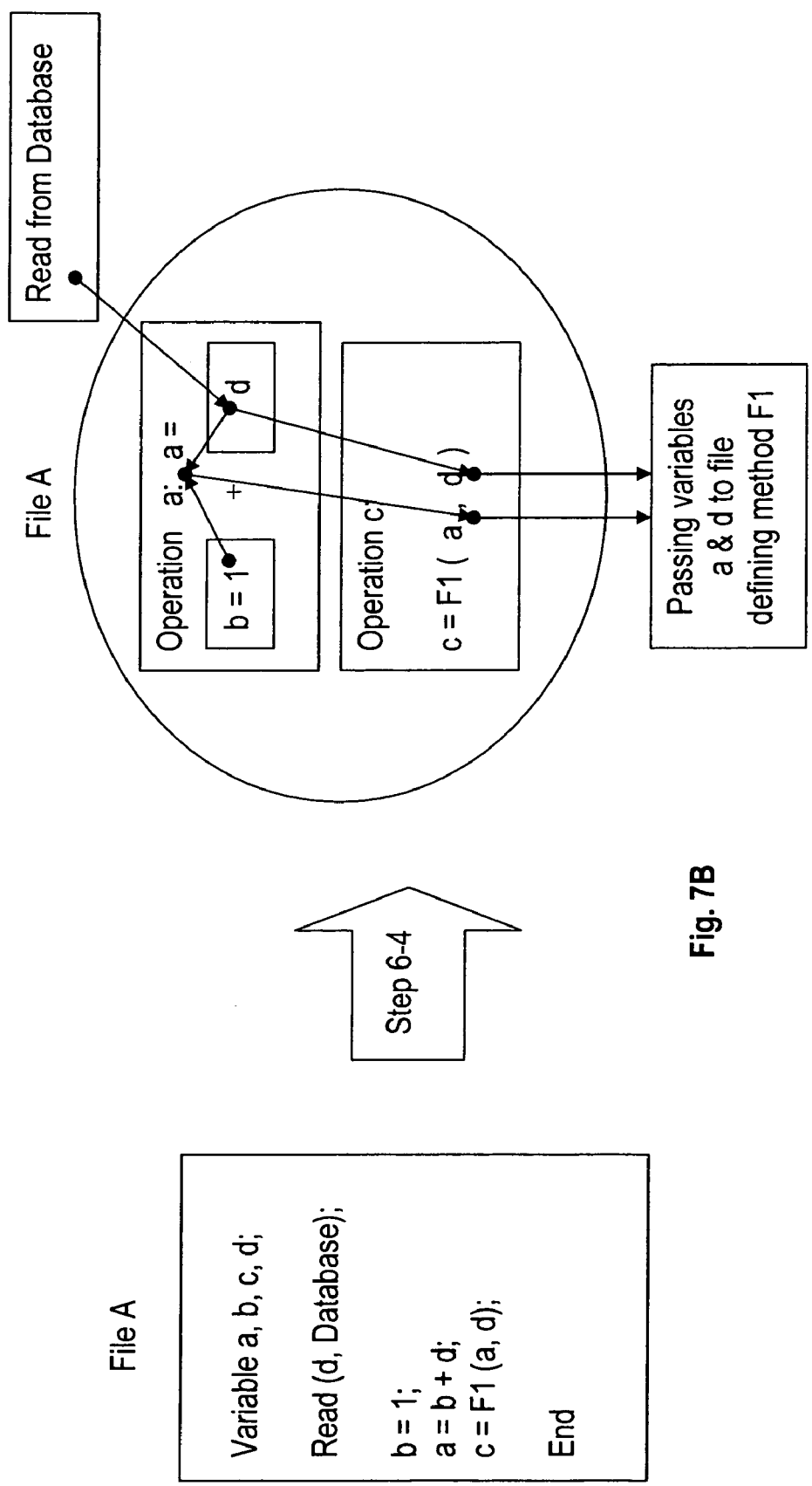
FIG. 7B is an illustrative diagram showing the process of step 6-4 of creating an abstracted model of the caller/provider relationships for File A.

FIG. 7B shows an illustrative process of step 6-4 as applied to File A. The complete data flow of File A has been determined by logically executing each line of code. In particular, the software agent determines that a data element is read from a database and stored in variable d. Variable d is then used in operation a to be added with the initialized variable b. The results of operation a are used as one of the variables passed through the function call of method F1. Variable d is also used as one of the variables passed through the function call of method F1.

Figure 7C:
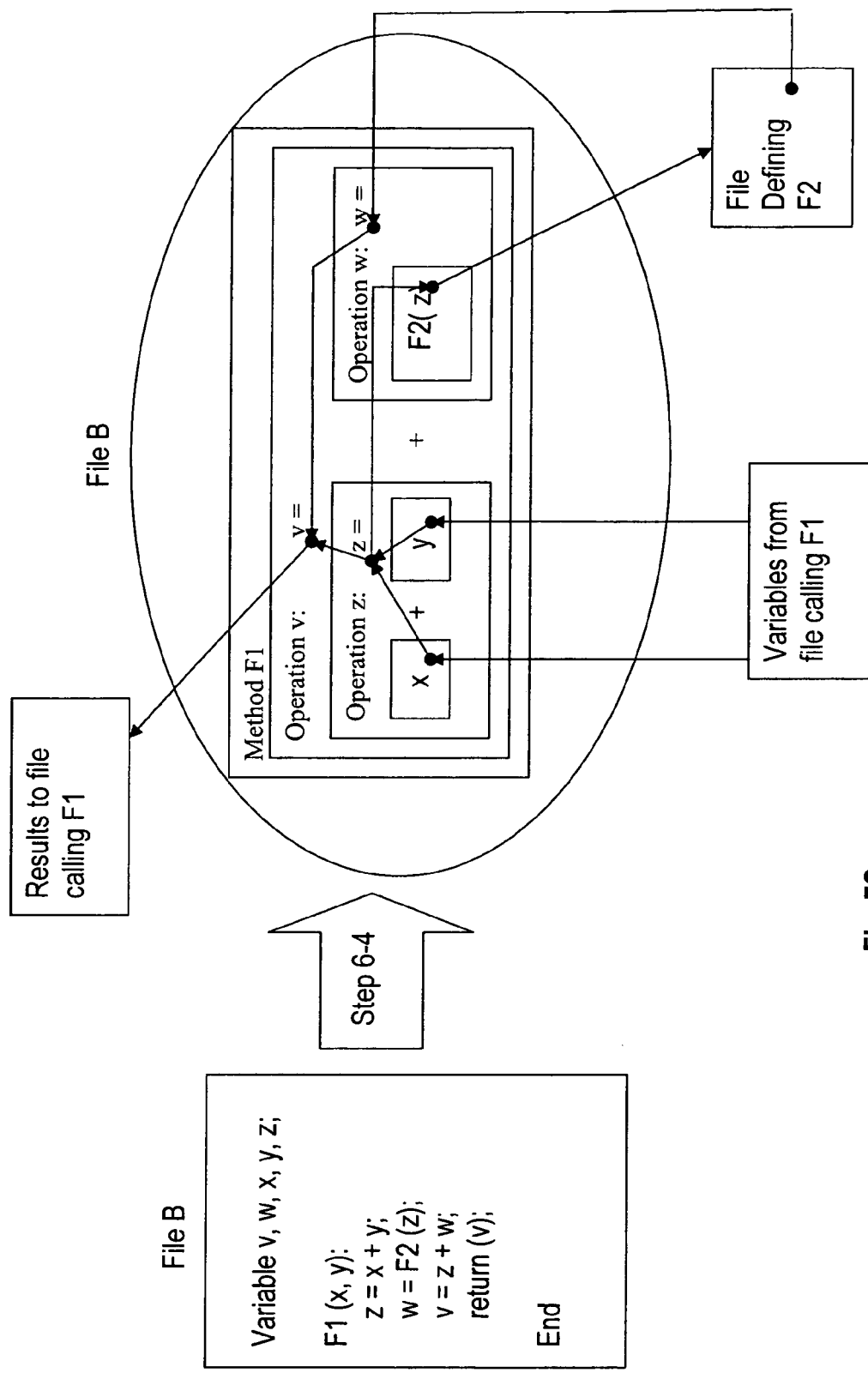
FIG. 7C is an illustrative diagram showing the process of step 6-4 creating an abstracted model of the caller/provider relationships for File B.

FIG. 7C shows an illustrative process of step 6-4 as applied to File B. Similar to File A, the complete data flow of File B has been determined by logically executing each line of code. In particular, the software agent determines that two values are input to variables x and y from the file calling method F1. Operation z then adds the values passed into variables x and y. Operation w takes the result of operation z and passes it through a function call of method F2 to the file defining method F2. The result of method F2 is then stored in variable w. Operation v then adds the results of operation z and operation w, and finally the result of operation v is passed to the file calling method F1.

In step 6-5 an abstracted model of the caller/provider relationships for the entire application are finalized with a mapping software agent. This is accomplished through an end-to-end mapping of the internal data flow through multiple components in the application as well as mapping internal interfaces from function to function and internal fields to internal parameters. The identification of touch points external to the application are also finalized through function to function calls and mapping of internal fields to external parameters. With the completion of this step, all the external interfaces and external interface parameters of a given application have been identified. Finally, the application data elements are mapped to the abstracted database models determined in step 6-3.

Figure 7D:
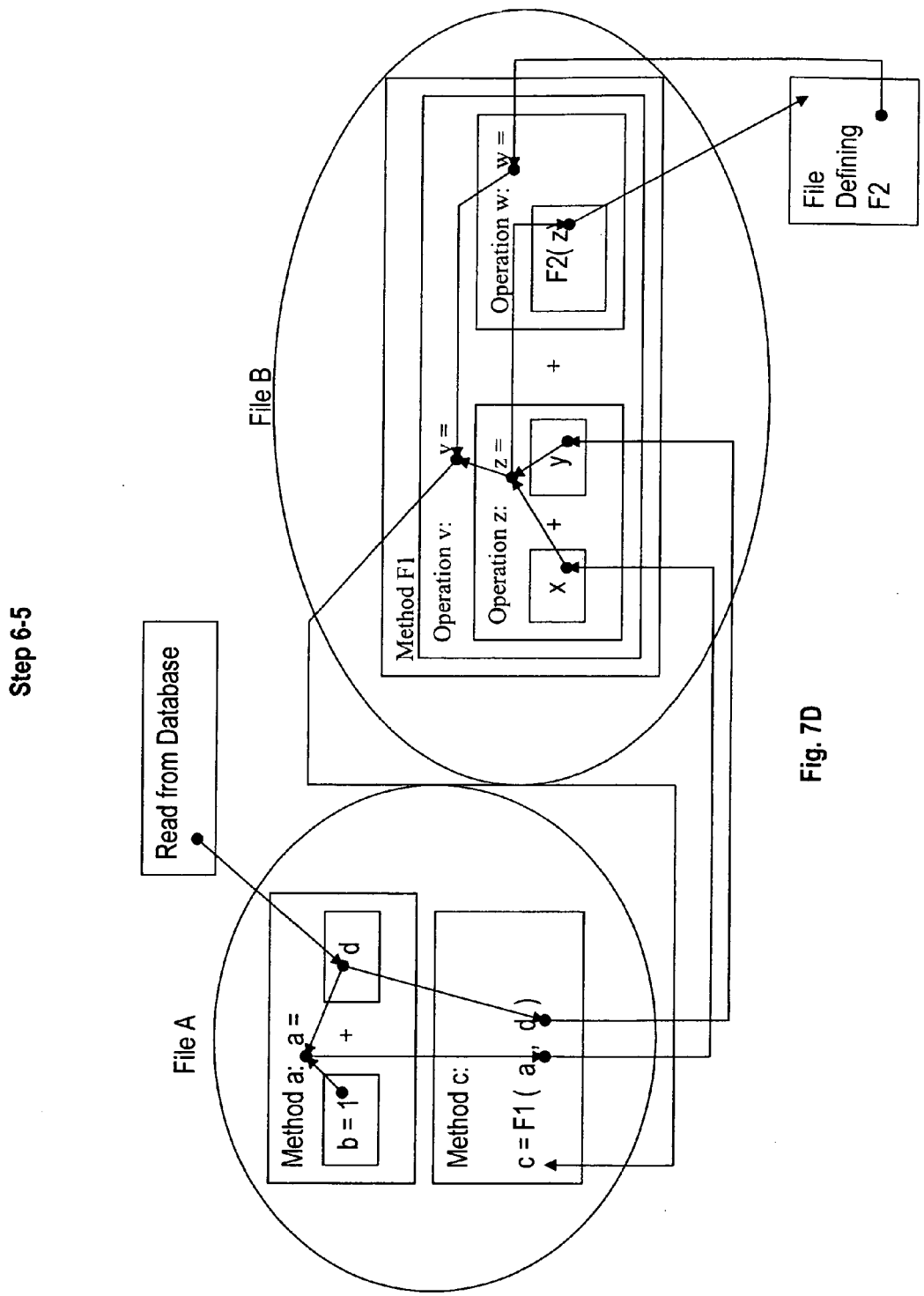
FIG. 7D is an illustrative diagram showing the process of step 6-5 of creating an abstracted model of the caller/provider relationships for the entire application.

FIG. 7D shows an illustrative process of step 6-5 for Application 1. The software agent identifies the touch point of calling method F1 in File A and the touch point of defining method F1 in File B as well as the transaction of passing the values of variables a and d of File A to the variables x and y in File B. As such, variables a and d of File A are mapped to variables x and y of File B. The software agent also identifies the touch point of passing the results of operation v to the file calling method F1 and the touch point of the results of method F1 in File A being stored in variable c. As such, the software agent also maps the results of operation v in File B to variable c in File A. The data element of the database read from in File A is also mapped to variable d of File A by the software agent. Also, an external touch point is identified through method call F2 in File B. It is determined to be external to Application 1 since method F2 isn't defined in any of the files in Application 1. The determination of the external touch point identifies a touch point to a secondary candidate application such as those shown in FIG. 8.

In step 6-6 a system of record (SOR) analysis is performed to identify the data owner/SOR of data structures by determining which components execute direct database access. The SOR analysis allows for mapping the data flow throughout the entire system from origin to destination. In the example of FIGS. 7A-7D Application 1 would be identified as the SOR for the data element read from the database.

Figure 8:
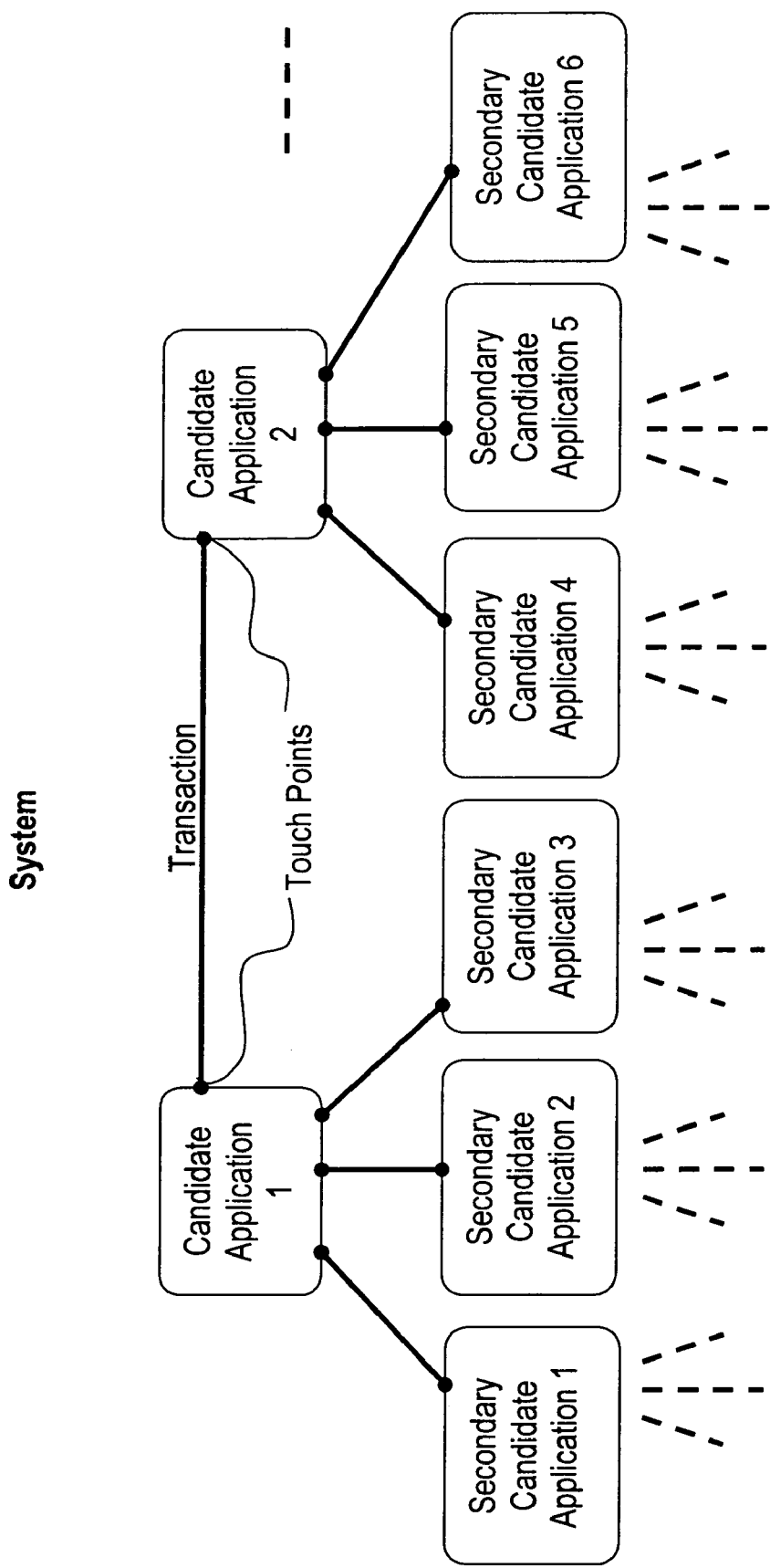
FIG. 8 is an illustrative diagram showing the waterfall effect of identifying other applications from the candidate applications through touch points.

Looking back to FIG. 5, in step 5-3 it is a determined whether there are additional applications to be analyzed in the system. This determination is performed by analyzing the external touch points found in steps 6-4 and 6-5 to determine if there are any touch points associated with other applications within the system. This process is illustrated in FIG. 8. The candidate applications selected in step 5-1 are those shown on the first tier. Through the analysis performed in steps 6-4 and 6-5, touch points are determined between all of the candidate applications and any application they associate with. These touch points can be between the candidate applications themselves or with secondary candidate applications in the system that have yet to be analyzed. When it is determined that the only remaining touch points are those external to the system then it has been determined that all of the applications in the system have been abstracted.

In step 5-4 a system mapping software agent is run to identify and map the touch points between the applications and components in the abstract interface models. This mapping is performed by matching based on function names, parameters (e.g., count, sequence, types, etc.), and caller/provider relationships. This step results in a final association between functions and fields in inter-application communications within the system to create a system logical data model.

Figure 9:
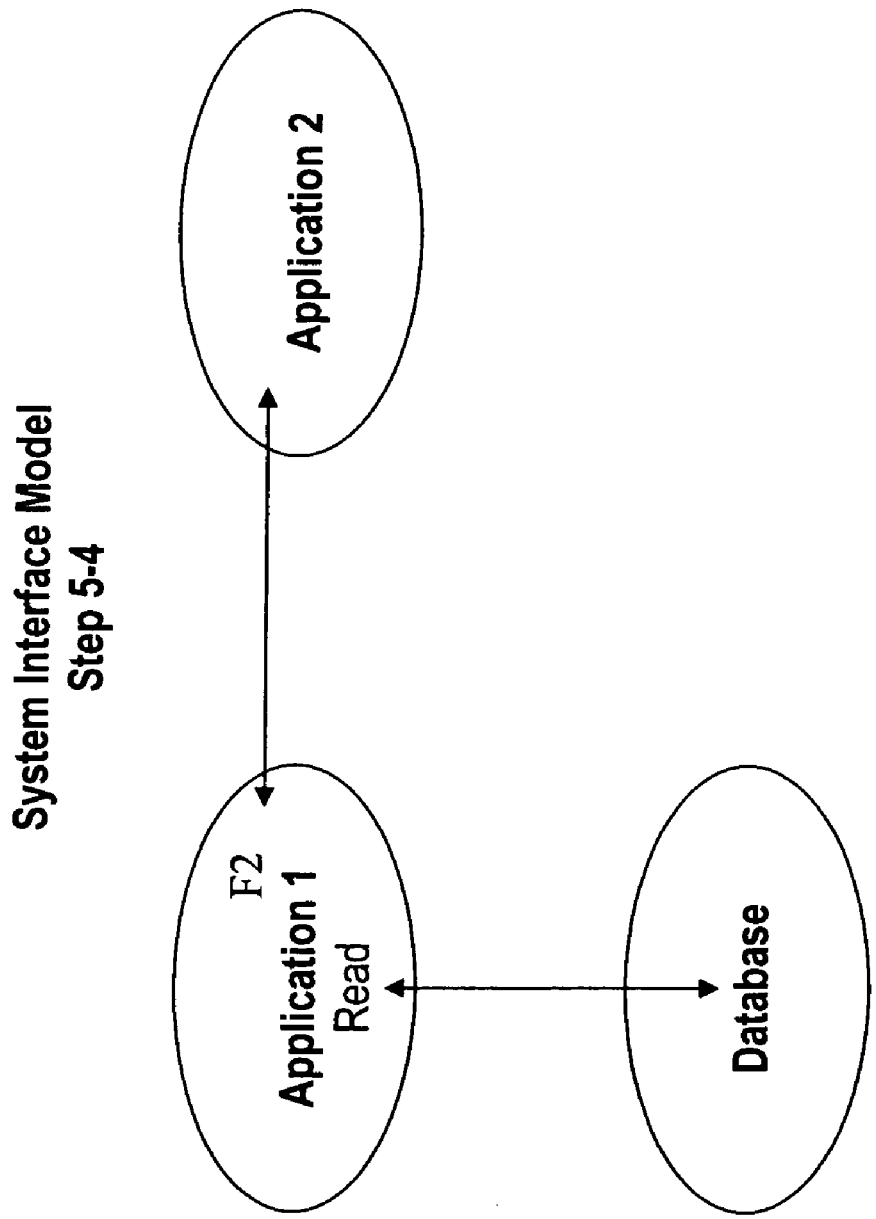
FIG. 9 is an illustrative diagram showing the process of step 5-4 of identifying and mapping the touch points between the applications and components in the abstract interface models.

FIG. 9 shows an illustrative process of step 5-4 for the system of Application 1. In particular FIG. 9 expands the example shown in FIG. 7D to indicate how the application-level caller/provider relationships of Application 1 might look.

In step 5-5 the system logical data model is stored as a set of structures and data elements in a metadata repository. The metadata repository enables improved impact analysis, serves as a tool for implementing application rationalization, and aids in the creation of future code for the generation of new applications or systems.

Looking at FIG. 2 the impact analysis could be for determining whether any additional elements would be needed from system A to add additional fields to the output element presented to system C. Specifically, in FIG. 3 if a programmer wanted the output element to also include a customer's previous address, an impact analysis would reveal that no additional data fetches would be required from the back end. Alternatively if the programmer wanted the output element to also include what services are being provided to a customer, an additional element or group of elements would need to be fetched from the back end.

Application rationalization can be performed by determining either applications that have very few, duplicative, or no touch points. The lack of touch points would indicate that either you have an isolated group of applications for improved security or you have applications that aren't necessarily needed.

As an example of the type of code that could be generated from the metadata repository, when setting out to build a new system or modify an existing one, there exists a set of requirements identifying what the new or modified system will do. These requirements ultimately define obtaining certain data, manipulating it, and using it for some purpose. The requirements can then be decomposed to identify the data elements being asked for. These data elements would be identified in the metadata repository. Based on how the data would be manipulated in the new or modified system, a skeleton of the code required to retrieve and update the data could be generated. The designer of the new or updated system would then simply have to provide how the data is to be manipulated and used.

In step 5-6 it is shown that an additional step of performing the abstraction of all of the systems and databases across an enterprise can be performed in the same way as outlined above. For example, in the enterprise model shown in FIG. 1 all of the systems in the front end are independently analyzed and abstracted, all of the systems in the back end are independently analyzed and abstracted, and the middleware environment is analyzed and abstracted either as a single system or a group of systems. Once all of the systems have been abstracted an enterprise logical data model may be constructed (or an existing enterprise logical data model may be refined) by associating meaning with identified variables. A user may refer to a pre-existing enterprise logical data model, variable names, database fields, and relationships to other variables to associate meaning with identified variables.

Figure 10:
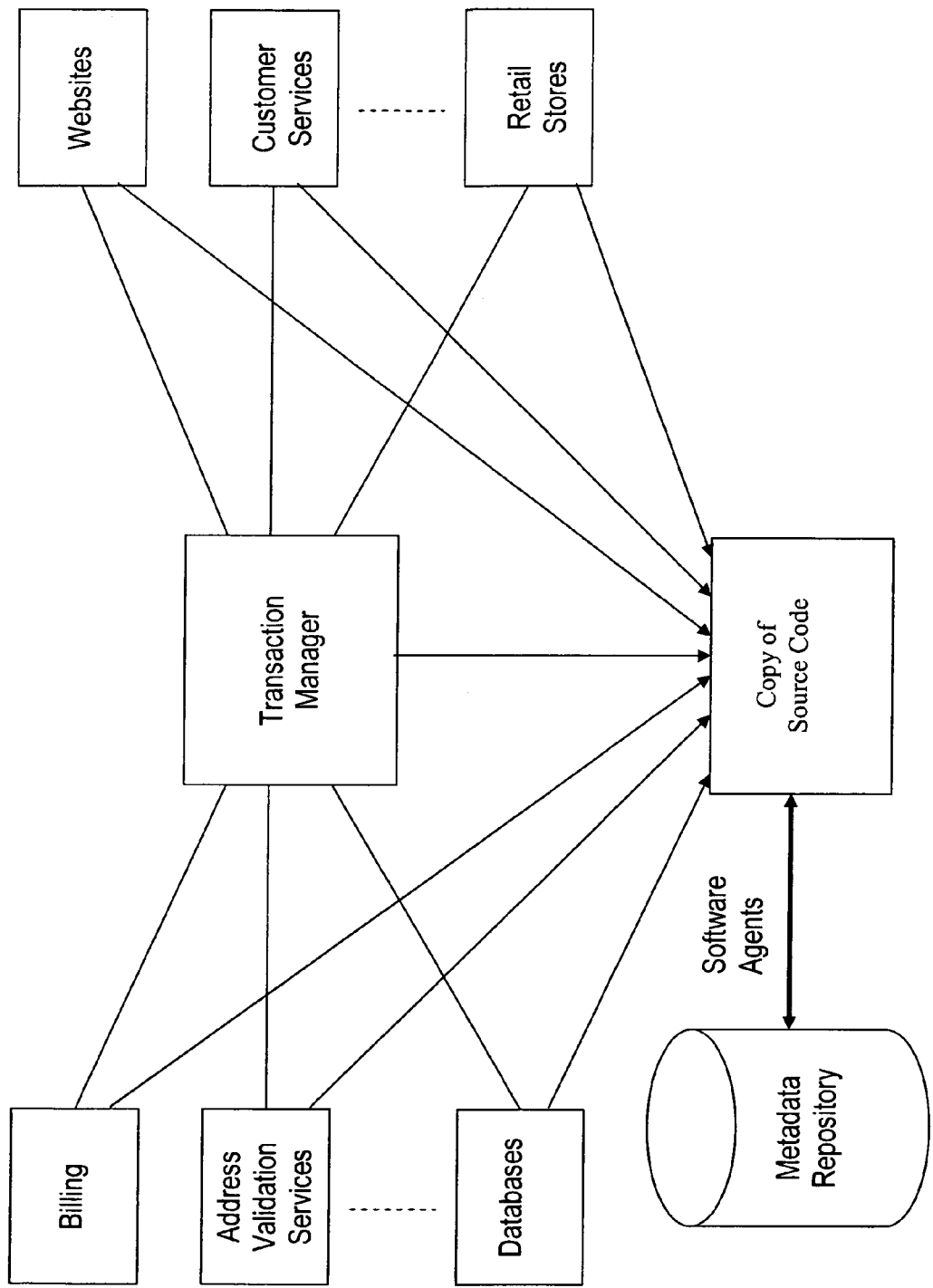
FIG. 10 is an illustrative block diagram representation of the software agents acting on copies of source code to collect data to be stored in the metadata repository.

In step 5-7 the abstracted enterprise model would be stored as a set of structures and data elements in the metadata repository similar to step 5-5. FIG. 10 is an example of an enterprise with the software agents operating on copies of the source code to provide the software interface maps of each system in the enterprise and store the maps in the metadata repository. The software agents are operating on copies of the source code so as to enable the enterprise to continue operating as normal and not have any enterprise resources used up by the software agents while the mapping is occurring. Similar to the benefits obtained in the system level abstraction, the creation of an enterprise logical data model allows for improved impact analysis, a tool for implementing system rationalization, and aids in the creation of future code for the generation of new applications or systems within the enterprise. It also enables a user to determine data flow start to finish through the entire enterprise which is useful for enabling better data management and the reduction of redundant operations.

It is noted that U.S. application Ser. No. 11/321,380 entitled "System and Method for Determining the Level of Effort For a Project" is an example of how to utilize the metadata repository created by the foregoing description, the contents of which are herein incorporated by reference in their entirety. In particular, the method described herein of creating a metadata repository can be used to populate the data model 205 of U.S. application Ser. No. 11/321,380, which can then be used to determine the level of effort for a project.

It is noted that once the metadata repository is created, it should be updated as new systems or applications are deployed. Further, multiple versions of the software interface map stored in the metadata repository may exist to enable additional analysis related to deployment of releases or backing out applications or systems.

As such, the foregoing description discloses systems and methods for creating software interface maps on an abstract level in an automated fashion. These systems and methods allow for improved impact analysis, a tool for implementing application rationalization, and a tool in the creation of future applications and systems. It should be noted that the foregoing description discloses illustrative embodiments for a clear understanding of the principles of the invention. Many variations and modifications may be made to the above-described embodiment of the invention without departing substantially from the spirit and principles of the invention. For example, the foregoing description can be implemented as a computer-readable storage medium containing a set of instructions for implementing the processes described above. All such modifications and variations are intended to be included herein within the scope of the present invention as defined by the following claims.

What is claimed is:

1. A method of documenting caller and provider relationships, data structures, and data transformations as a system logical data model, comprising the steps of:
   building, by an interface mapping tool stored on a computer-readable storage medium, an abstract interface model for each of a plurality of applications deployed in a system in an enterprise, wherein each of the plurality of applications comprises one or more source code files and one or more data files, and wherein building the abstract interface model by the interface mapping tool includes:
      selecting a list of said one or more source code files and said one or more data files associated with each of the plurality of applications;
      individually analyzing said one or more source code files to determine the structure and interfaces of each of said one or more source code files;
      identifying internal and external touch points for each of said one or more source code files by:
         identifying any interaction between one of said one or more source code files and another of said one or more source code files, between said one or more source code files and said one or more data files, and between one of said one or more data files and another of said one or more data files
         parsing each source code file to determine the logical outcome of each line of source code; and
         determining a sequence of calls made in each method of the source code file; and
      linking internal and external touch points between said one or more source code files and said one or more data files comprised in each of the plurality of applications;
   building, by the interface mapping tool, a system logical data model from said abstract interface models through the identification and linking of touch points between said abstract interface models; and
   storing said system logical data model as a set of structures and data elements in a metadata repository.

2. The method of claim 1, further comprising:
   identifying a group of candidate applications deployed in the system;
   determining if touch points from said candidate applications to other applications in the system exist; and
   repeating said building an abstract interface model step and said determining step for each application identified in said determining step.

3. The method of claim 2, wherein said candidate applications are automatically identified.

4. The method of claim 2, wherein said candidate applications are manually identified.

5. The method of claim 3, wherein said automatic identification is performed by determining high-traffic nodes in the system.

6. The method of claim 1 wherein the step of selecting a list of said one or more source code files and said one or more data files associated with each of the plurality of applications further comprises the steps of:
   selecting files which can generate source code files if source code files are not available; and
   generating source code files from said files which can generate source code files when legally permissible.

7. The method of claim 1 further comprising the step of: performing a system of record analysis to determine which applications execute direct database access.

8. The method of claim 1, wherein said step of individually analyzing said one or more source code files comprises:
   determining the classes, variables, methods, and method parameters of each source code file.

9. The method of claim 1 further comprising the step of: analyzing said one or more data files to determine the tables, constraints, columns, and views of each schema in said one or more data files.

10. The method of claim 1, wherein the step of identifying internal and external touch points further comprises the steps of:
    mapping internal variables to method parameters and method variables;
    mapping component data elements to database data elements; and
    determining the flow of data in transformations of data elements through method execution.

11. The method of claim 1, further comprising the steps of:
    building a system logical data model for each system in the enterprise;
    building an enterprise logical data model by associating meaning with identified variables of said system logical data models; and
    storing said enterprise logical data model in said metadata repository.

12. A computer-readable storage medium containing a set of instructions for documenting caller and provider relationships, data structures, and data transformations as a system logical data model, the set of instructions comprising:
    an instruction for building an abstract interface model for each of a plurality of applications deployed in a system in an enterprise, wherein each of the plurality of applications comprises one or more source code files and one or more data files, and wherein the instruction for building includes:
       selecting a list of said one or more source code files and said one or more data files associated with each of the plurality of applications;
       individually analyzing said one or more source code files to determine the structure and interfaces of each of said one or more source code files;
       identifying internal and external touch points for each of said one or more source code files by:
          identifying any interaction between one of said one or more source code files and another of said one or more source code files, between said one or more source code files and said one or more data files, and between one of said one or more data files and another of said one or more data files;
          parsing each source code file to determine the logical outcome of each line of source code; and
          determining a sequence of calls made in each method of the source code file; and
       linking internal and external touch points between said one or more source code files and said one or more data files and specifying a data flow to and from each touch point across each of the plurality of applications;
    an instruction for building a system logical data model from said abstract interface models through the identification and linking of the touch points between said abstract interface models; and an instruction for storing said system logical data model as a set of structures and data elements in a metadata repository.

13. The set of instructions of claim 12 further comprising:
an instruction for identifying a group of candidate applications in the system;
an instruction for determining if touch points to other applications in the system exist; and
an instruction for repeating for each application identified in said instruction for determining said instruction for building an abstract interface model instruction and said instruction for determining.

14. The set of instructions of claim 12, wherein said instruction for building an abstract interface model for each of the plurality of applications deployed in the system comprises the set of instructions of:
an instruction for selecting a list of said one or more source code files and said one or more data files associated with each of the plurality of applications;
an instruction for individually analyzing said one or more source code files to determine the structure and interfaces of each of said one or more source code files;
an instruction for identifying internal and external touch points for each of said one or more source code files; and
an instruction for linking internal and external touch points between said one or more source code files and said one or more data files and specifying a data flow to and from each touch point across each of the plurality of applications.

15. The set of instructions of claim 12, further comprising:
an instruction for building a system logical data model for each system in the enterprise;
an instruction for building an enterprise logical data model by associating meaning with identified variables of said system logical data models; and
an instruction for storing said enterprise logical data model in said metadata repository.

16. A system comprising:
a storage device that stores duplicate copies of source code files and data files for each of a plurality of applications deployed on each of a plurality of systems in an enterprise;
a plurality of software agents acting on said copies of source code files and data files to build an abstract interface model for each application in a system, wherein building the abstract interface model includes:
selecting a list of said copies of source code files and data files for each of the plurality of applications;
individually analyzing said copies of source code files to determine the structure and interfaces of each of said copies of source code files;
identifying internal and external touch points for each of said copies of source code files by:
identifying any interaction between one of said copies of source code files and another of said copies source code files, between said copies of source code files and said copies of data files, and between one of said copies of data files and another of said copies of data files,
parsing each of said copies of source code files to determine the logical outcome of each line of source code, and
determining a sequence of calls made in each method of said copies of source code files; and
linking internal and external touch points between said copies of source code files and said copies of data files and specifying a data flow to and from each touch point across each of the plurality of applications,
wherein the plurality of software agents build a system logical data model from said abstract interface models through the identification and linking of the touch points between said abstract interface models; and
a metadata repository for storing the system logical data model built by said software agents from said copies of source code files and said data files.

17. The system of claim 16, wherein said software agents further act on said source code files to:
identify a group of candidate applications in the system;
determine if touch points to other applications in the system exist;
repeating said act of building an abstract interface model and said act of determining for each application identified in said act of determining.

* * * * *